United States Patent
Wu et al.

(10) Patent No.: US 11,701,781 B2
(45) Date of Patent: Jul. 18, 2023

(54) MULTI-ARM ROBOT FOR REALIZING CONVERSION BETWEEN SITTING AND LYING POSTURE OF PATIENTS AND CARRYING PATIENTS TO DIFFERENT POSITIONS

(71) Applicants: DALIAN UNIVERSITY OF TECHNOLOGY, Liaoning (CN); CHENGDU RESEARCH INSTITUTE, DALIAN UNIVERSITY OF TECHNOLOGY, Sichuan (CN)

(72) Inventors: Di Wu, Liaoning (CN); Caiyi Zhong, Liaoning (CN); Xin Wang, Liaoning (CN); Jinghui Sun, Liaoning (CN)

(73) Assignees: DALIAN UNIVERSITY OF TECHNOLOGY, Liaoning (CN); CHENGDU RESEARCH INSTITUTE, DALIAM UNIVERSITY OF TECHNOLOGY, Sichuan (CN)

( * ) Notice: Subject to any disclaimer, the term of this patent is extended or adjusted under 35 U.S.C. 154(b) by 97 days.

(21) Appl. No.: 17/607,623

(22) PCT Filed: Aug. 26, 2020

(86) PCT No.: PCT/CN2020/111278
§ 371 (c)(1),
(2) Date: Oct. 29, 2021

(87) PCT Pub. No.: WO2021/253629
PCT Pub. Date: Dec. 23, 2021

(65) Prior Publication Data
US 2022/0314457 A1    Oct. 6, 2022

(30) Foreign Application Priority Data
Jun. 16, 2020 (CN) .......................... 202010545969.2

(51) Int. Cl.
*B25J 19/00* (2006.01)
*B25J 11/00* (2006.01)
(Continued)

(52) U.S. Cl.
CPC .............. *B25J 11/009* (2013.01); *B25J 5/007* (2013.01); *B25J 9/0084* (2013.01); *B25J 19/002* (2013.01)

(58) Field of Classification Search
CPC ...... B25J 9/0087; B25J 19/002; B25J 9/0084; B25J 19/027; B25J 11/009; B25J 5/007
See application file for complete search history.

(56) References Cited

U.S. PATENT DOCUMENTS 9,221,172 B2 * 12/2015 Williamson ........... B25J 9/1633
10,486,311 B2 * 11/2019 Mozeika ................ B25J 13/065
(Continued)

FOREIGN PATENT DOCUMENTS

CN   102902271 A   1/2013
CN   103624776 A   3/2014
(Continued)

OTHER PUBLICATIONS

Kuma et al., Conception and development of Dexto: Eka: The humanoid robot—Part III, 2013, IEEE, p. 1-6 (Year: 2013).*

(Continued)

*Primary Examiner* — McDieunel Marc
(74) *Attorney, Agent, or Firm* — Muncy, Geissler, Olds & Lowe, P.C.

(57) ABSTRACT

A multi-arm robot for realizing conversion between sitting and lying posture of patients and carrying patients to different positions is disclosed. The complete robot includes a manipulator module, a trunk module, a chassis moving module and a control module. The manipulator module comprises at least three manipulators, which are connected (Continued)

with the trunk module by linear modules. The trunk module comprises a trunk body and four linear modules, which are connected with the chassis moving module by bolts. The chassis moving module comprises a plurality of omnidirectional wheels and a telescopic counterweight. The control module includes an actuator module, an operation module, an information acquisition module, a motion control module, a data processing module, a communication module and an early warning module.

6 Claims, 5 Drawing Sheets

(51) Int. Cl.
  *B25J 5/00* (2006.01)
  *B25J 9/00* (2006.01)

(56) References Cited

U.S. PATENT DOCUMENTS

| | | | |
|---|---|---|---|
| 10,518,372 B2* | 12/2019 | Bergeron | B25J 9/0006 |
| 10,561,470 B2* | 2/2020 | Hourtash | A61B 34/37 |
| 10,813,710 B2* | 10/2020 | Grubbs | G09B 23/285 |
| 10,843,331 B2* | 11/2020 | Mozeika | B25J 5/005 |
| 11,351,001 B2* | 6/2022 | Jarc | A61B 34/35 |
| 11,369,443 B2* | 6/2022 | Shelton, IV | A61B 17/3421 |
| 11,369,448 B2* | 6/2022 | Hassan | A61B 34/73 |
| 11,484,379 B2* | 11/2022 | Sutherland | A61B 90/90 |
| 11,498,216 B2* | 11/2022 | Saruta | B25J 3/00 |

FOREIGN PATENT DOCUMENTS

| | | |
|---|---|---|
| CN | 106695807 A | 5/2017 |
| CN | 107378963 A | 11/2017 |
| CN | 108818543 A | 11/2018 |
| CN | 110394816 A | 11/2019 |
| CN | 110434863 A | 11/2019 |
| CN | 110960372 A | 4/2020 |
| JP | 2008100053 A | 5/2008 |
| KR | 20190059470 A | 5/2019 |
| KR | 20200013376 A | 2/2020 |

OTHER PUBLICATIONS

Stückler et al., Integrating indoor mobility, object manipulation, and intuitive interaction for domestic service tasks, 2009, IEEE, p. 506-513 (Year: 2009).*

Nycz et al., A bio-robotics approach to real-time skeletal joint fluoroscopy during natural movements, 2011, IEEE, p. 3376-3381 (Year: 2011).*

Xiaolong et al., Design of a wireless obstacle-crossable exploration robot, 2015, IEEE, p. 4860-4864 (Year: 2015).*

Wang Xin et al., "3-DOF arm Trajectory Planning for Medical Transfer Robot", Technology & Equipment, pp. 88-91, Feb. 21, 2020.

* cited by examiner

MULTI-ARM ROBOT FOR REALIZING CONVERSION BETWEEN SITTING AND LYING POSTURE OF PATIENTS AND CARRYING PATIENTS TO DIFFERENT POSITIONS

TECHNICAL FIELD

The present invention relates to technical field of medical assistance robot, in particular to a transportation robot which can adjust the posture of the patient and achieve steady lifting, lowering plus smooth horizontal movement for a human body.

BACKGROUND

With the advent of aging problem in China, increasing number of disabled/semi-disabled people, as well as the shortage of nursing staff and the high intensity of nursing work, resulting in big growth of nursing cost which makes it difficult for ordinary families to undertake. This phenomenon has been leading manufacturers to produce various types of nursing beds. Although, these products can manage to convert patients' posture between lying and sitting, strong physical strength from nursing staff still be required in order to carry the patient in between different equipment such as cleaning beds and hospital beds when beds and patients need to be cleaned. Moreover, in the daily care of paralytic patients, physically disabled patients and patients under anesthesia, it is also necessary to relocate patients back and forth between different carriers, hence, it is obvious that the work intensity of nursing staff is tremendous.

SUMMARY

In the view of problems in the prior art, the present invention designed and implemented a multi-arm robot for realizing conversion between sitting and lying posture of patients and carrying patients to different positions, which can fully replace nursing staff, achieving mechanical carrying to patients among operating tables, hospital beds and wheelchairs. It can meet the bathing and nursing requirements for patients and reduce the work intensity of nursing staff.

The technical solution provided by the present invention is as follows:

The multi-arm robot for realizing conversion between sitting and lying posture of patients and carrying patients to different positions, includes a manipulator module, a trunk module 2, a chassis moving module 3 and a control module 4; The manipulator module is composed of at least three manipulators 1, and has at least three points of action on human body: shoulder-back, a point between caudal vertebrae and lumbar vertebrae and knee; The trunk module 2 comprises a trunk column 21, a trunk shell 22 and four linear modules 23; The linear modules 23 are connected with manipulators by manipulator connectors; The chassis moving module 3 consists of a chassis frame 31, a telescopic counterweight 32 and omnidirectional wheels 33; The upper part of chassis frame 31 is connected with the trunk column 21; The telescopic counterweight 32 is arranged on the chassis frame 31; The omnidirectional wheels 33 are arranged around the chassis frame 31 in a cross layout; The control module 4 includes a actuator module, an operation module, an information acquisition module, a motion control module, a data processing module, a communication module and an early warning module.

As a preferred implementation solution, the manipulators of the multi-arm robot in the present invention not only act at shoulder-back, a point between the caudal vertebrae and the lumbar vertebrae and knee, but also act at head, thighs and maneuver positions of human body; The above-mentioned manipulators are arranged on both sides and in front of the trunk.

Furthermore, each manipulator comprises a shoulder joint 11, an upper arm 12, an elbow joint 13, a wrist joint 14 and a lower arm 15; The shoulder joints 11 realize left/right rotation of manipulators to adjust the location of points of action; The elbow joints 13 realize forward/backward rotation of manipulators to adjust the inclination angle of lower arms 15; The wrist joints 14 realize the rotation of lower arms 15 to adjust the contact angle between a patient and lower arms 15; The lower arms 15 are flat structure, each of which is composed of a lower arm plate 151 and a frontal movable folding structure; Each folding structure comprises a baffle 152 and a pull plate 153; The pull plates 153 are used to fix the baffles 152.

Furthermore, each manipulator has four degrees of freedom, including a linear moving pair and a rotating pair at the shoulder, a rotating pair at the elbow and a rotating pair at the wrist.

Furthermore, the trunk column 21 is a hollow structure, and each of the linear modules 23 comprises a linear module fixed seat 231 and a linear module sliding table 232; The linear module fixed seats 231 are fixed on the side wall of the trunk shell 22; The linear module sliding tables 232 are connected with manipulators by manipulator connectors; The linear module fixed seats 231 are fixed on the outer wall of the trunk column 21; The trunk shell 22 is wrapped outside the trunk column 21.

Furthermore, the telescopic counterweight 32 comprises two sliding guides 321, a counterweight seat 322 and counterweight blocks 323; The fixed rail of each sliding guide 321 is fixed on the chassis frame 31; The counterweight seat 322 is connected to the sliding rails of the sliding guides 321; The counterweight blocks 323 are placed on the counterweight seat 322; The omnidirectional wheels 33 are all equipped with shock absorbers.

Furthermore, the control module 4 comprises a main controller 41, two manipulator sub controllers 42, a chassis moving sub controller 43, an ultrasonic distance sensor 44 and an operating handle 45; The main controller 41 and the manipulator sub controllers 42 are arranged inside the trunk column 21; The chassis moving sub controller 43 is arranged under the chassis frame 31; The ultrasonic distance sensor 44 is arranged around the chassis frame 31; The operation handle 45 sends operation instructions to the main controller 41 by wireless communication; The main controller 41 sends the corresponding control instructions to the manipulator sub controllers 42 and the chassis moving sub controller 43, and sub controllers will control manipulators and chassis moving module to act according to the instructions received; The ultrasonic distance sensor 44 sends the distance information to the main controller 41 by sub controllers, and the main controller 41 judges whether there is a collision risk. The main controller will perform an emergency stop operation and give an alarm if necessary.

Compared with the prior art, the present invention has the following beneficial effects:

By cooperation of different parts, namely, manipulator module, trunk module, chassis moving module and control module, the multi-arm robot can achieve carrying for patients among operating tables, hospital beds and wheelchairs, as well as relocate patients to the machine for bathing. Thus, the work intensity of nursing staff will be reduced.

The multi-arm robot can detect load of each manipulator, realize the alternating load-bearing respectively, and automatically adjust the counterweight position. At the same time, it can measure distance of objects in surrounding environment in real time to ensure the safety and stability.

The lower arms of the multi-arm robot adopt flat structure, which can smoothly wedge into the gap between a patient and the bed without hurting human body. The front of each lower arm is a movable folding structure, which can give early warning before the patient slips.

Figure 1:
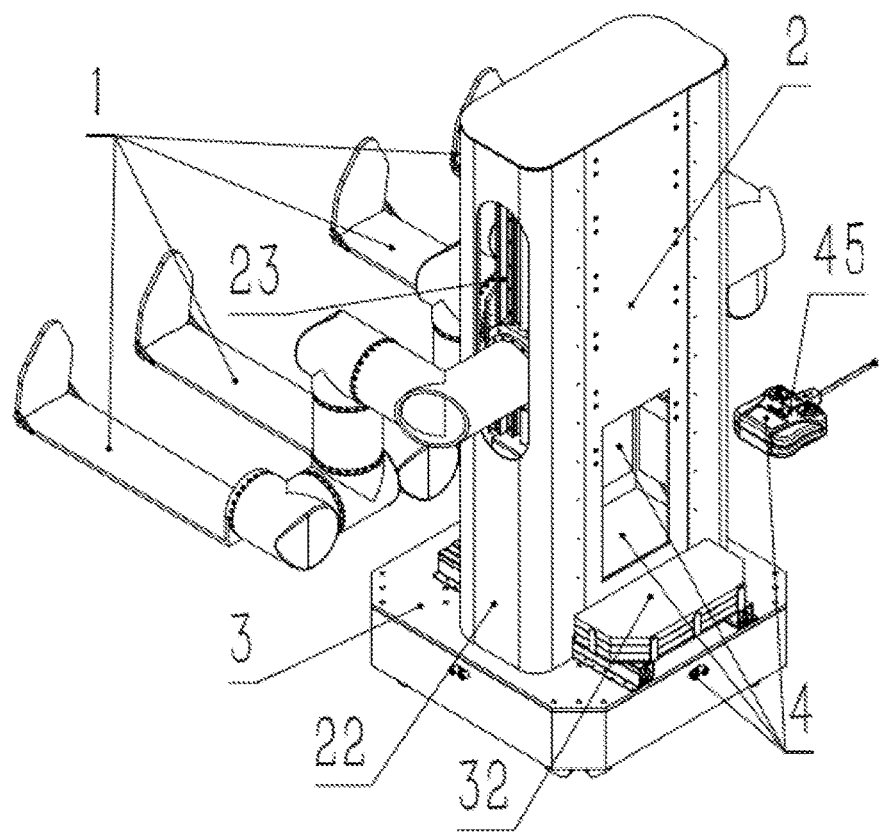
FIG. 1 is the overall structure diagram of the multi-arm robot.
Figure 2:
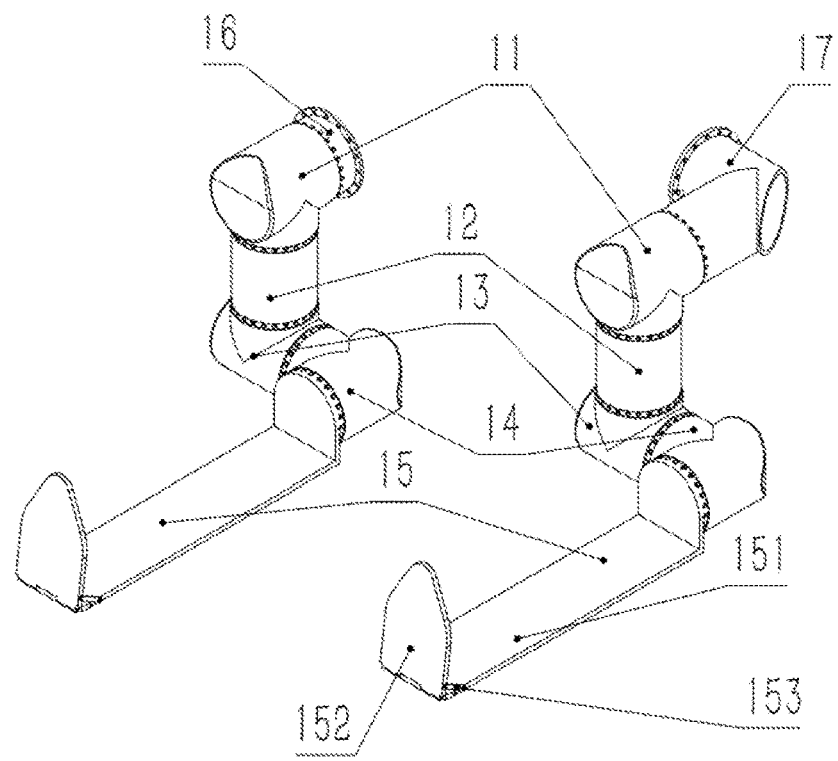
FIG. 2 is the structure diagram of lateral manipulator and frontal manipulator.
Figure 3:
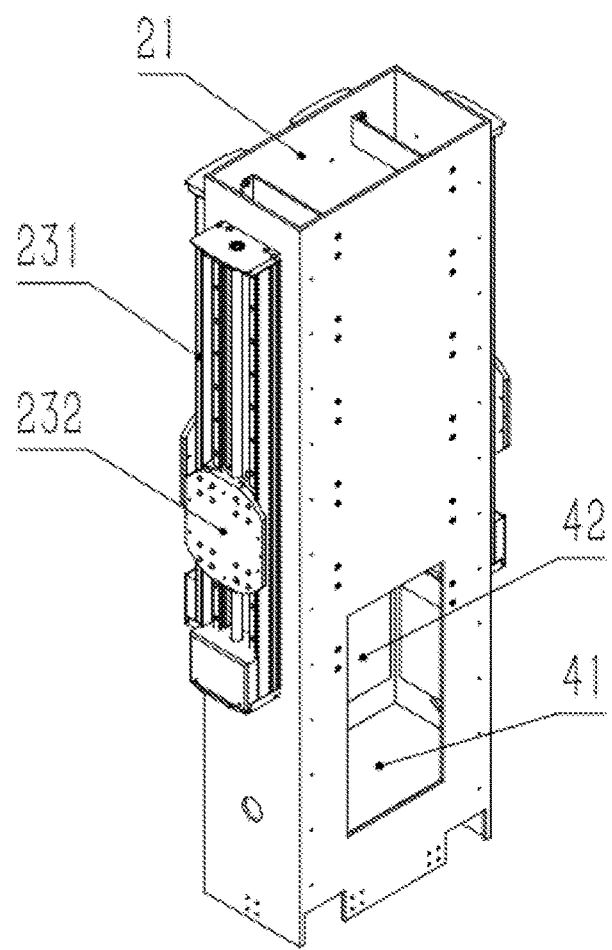
FIG. 3 is the structure diagram of the trunk module without trunk shell.
Figure 4:
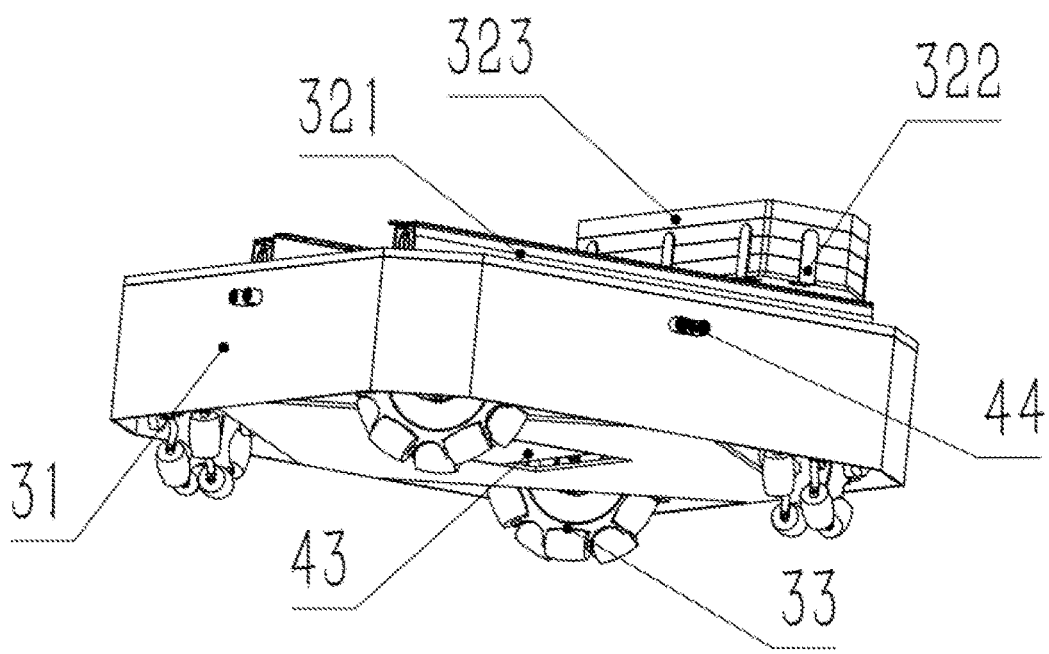
FIG. 4 is the structure diagram of the chassis moving module.

In the figures: 1. Manipulator module; 2. Trunk module; 3. Chassis moving module; 4. Control module; 11. Shoulder joint; 12. Upper arm; 13. Elbow joint; 14. Wrist joint; 15. Lower arm; 16. Frontal manipulators connector; 17. Lateral manipulator connector; 151. Lower arm plate; 152. Baffle; 153. Pull plate; 21. Trunk column; 22. Trunk shell; 23. Linear module; 231. Linear module fixed seat; 232. Linear module slide; 31. Chassis frame; 32. Telescopic counterweight; 33. Omnidirectional wheel; 321. Slide guide; 322. Counterweight seat; 323. Counterweight block; 41. Main controller; 42. Manipulator sub controller; 43. Chassis walking sub controller; 44. Ultrasonic distance sensor; 45. Operating handle.

DETAILED DESCRIPTION

The implementation process of the present invention will be described in detail below in combination with the accompany drawings and specific embodiments. The present invention is a multi-arm robot, and the following four-arm robot is taken as an example to describe the implementation.

The four-arm carrying robot as shown in FIGS. 1, 2, 3, 4 and 5 includes a manipulator module, a trunk module 2, a chassis module 3 and a control module 4. The manipulator module is composed of four manipulators 1, two of which are arranged on both sides of the trunk module 2 and other two manipulators are arranged in front of trunk module 2; The lateral manipulators are connected with the linear module slides 232 by the lateral manipulator connectors 17; The frontal manipulators are connected with the linear module slides 232 by the frontal manipulators connectors 16.

Each manipulator comprises a shoulder joint 11, an upper arm 12, an elbow joint 13, a wrist joint 14 and a lower arm 15; The lower arms 15 are connected with the wrist joints 14; The wrist joints 14 are directly connected with the elbow joints 13; The elbow joints 13 are connected with one end of the upper arms 12, and the other end of the upper arms 12 are connected with the shoulder joints 11; The shoulder joints 11 realize the left/right rotation of the manipulators to adjust positions of points of action; The elbow joints 13 realize the forward/backward rotation of the manipulators to adjust inclination angles of the lower arms 15; The wrist joints 14 realize the rotation of the lower arms 15 to adjust contact angles between the lower arms 15 and patients; Each lower arm 15 is a flat structure, which is composed of a lower atm plate 151 and a frontal movable folding structure; Each folding structure comprises a baffle 152 and a pull plate 153 used to fix the baffle 152.

The trunk module 2 comprises a trunk column 21, a trunk shell 22 and four linear module 23; Each linear modules 23 comprises a linear slide 232 and a linear fixed seat 231; The linear slides 232 are connected with manipulators by manipulator connectors; The linear fixed seats 231 are fixed on the side of trunk body; The trunk column 21 is a hollow structure; The linear fixed seats 231 are fixed on the outer wall of trunk column 21; The trunk shell 22 is wrapped up outside the trunk column 21.

The chassis moving module 3 comprises a chassis frame 31, a telescopic counterweight 32 and omnidirectional wheels 33; The upper part of chassis frame 31 is connected with trunk column 21. The telescopic counterweight 32 comprises two sliding guides 321, a counterweight seat 322 and counterweight blocks 323; The fixed rails of the sliding guides 321 are fixed on the chassis frame 31; The counterweight seat 322 is connected to the sliding rails of the sliding guides 321; The counterweight blocks 323 are placed on the counterweight seat 322.

The control module 4 comprises a main controller 41, two manipulator sub controllers 42, a chassis moving sub controller 43, an ultrasonic distance sensor 44 and an operating handle 45; The main controller 41 and the manipulator sub controllers 42 are arranged inside the trunk column 21; The chassis moving controller sub 43 is arranged under the chassis frame 31; The ultrasonic distance sensor 44 is arranged around the chassis frame 31; The operation handle 45 communicates with the main controller 41 by wireless mode; The main controller 41 is connected with the manipulator sub controllers 42 and the chassis moving sub controller 43 by EtherCAT bus; The manipulator sub controllers 42 are connected with the linear modules and the joint modules by CANopen bus; The operation handle 45 sends the operation instructions to main controller 41 by wireless mode, and the main controller 41 sends the corresponding control instructions to manipulator sub controllers 42 and chassis moving sub controller 43 according to the instructions received, then the sub controllers control manipulators and chassis moving module to act according to the control instructions received. The ultrasonic distance sensor 44 sends the distance information to the main controller 41 by sub controllers, and the main controller 41 judges whether there is a collision risk. The main controller 41 will perform an emergency stop operation and give an alarm if necessary.

Figure 5:
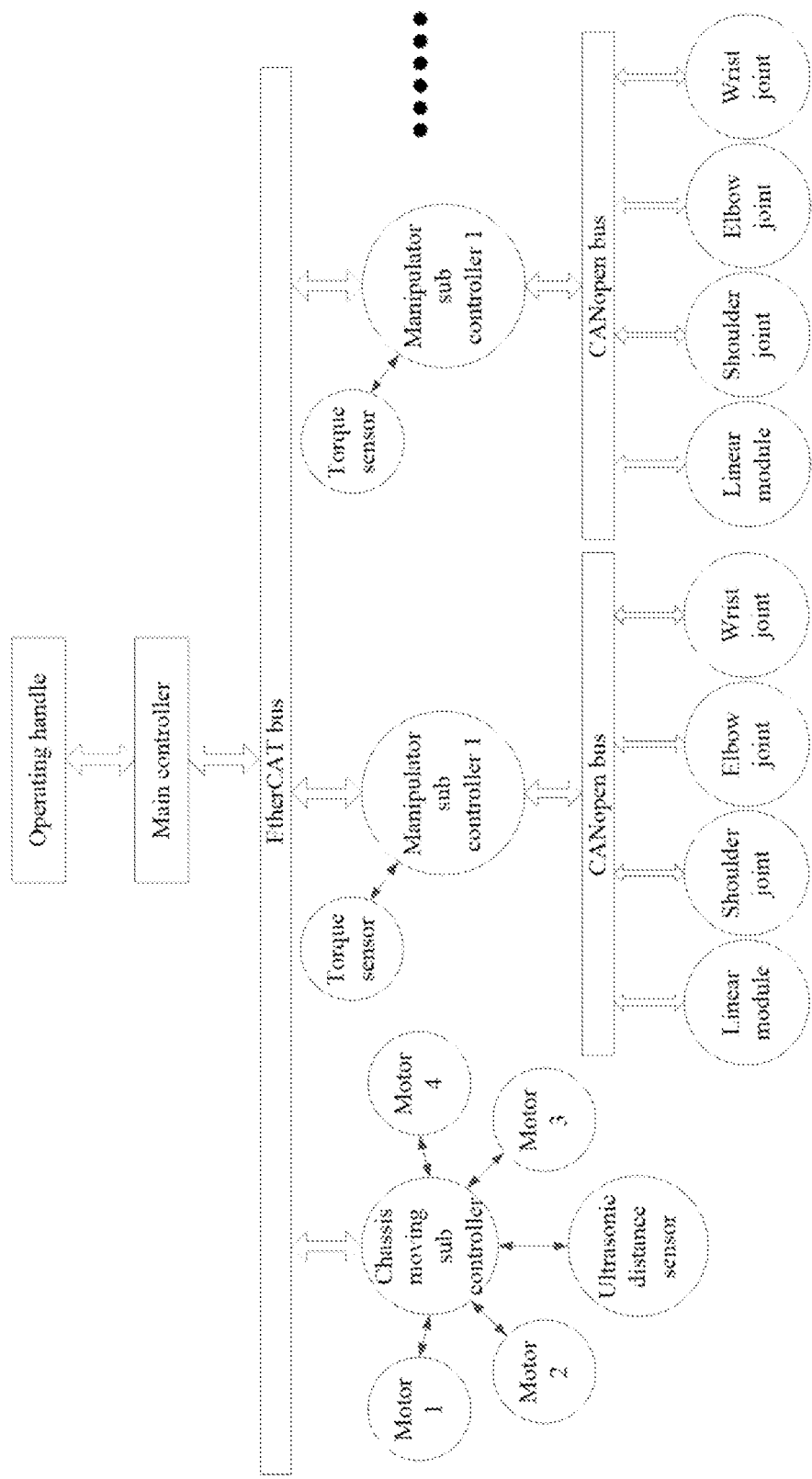
FIG. 5 is the block diagram of the control system composition.
Figure 6:
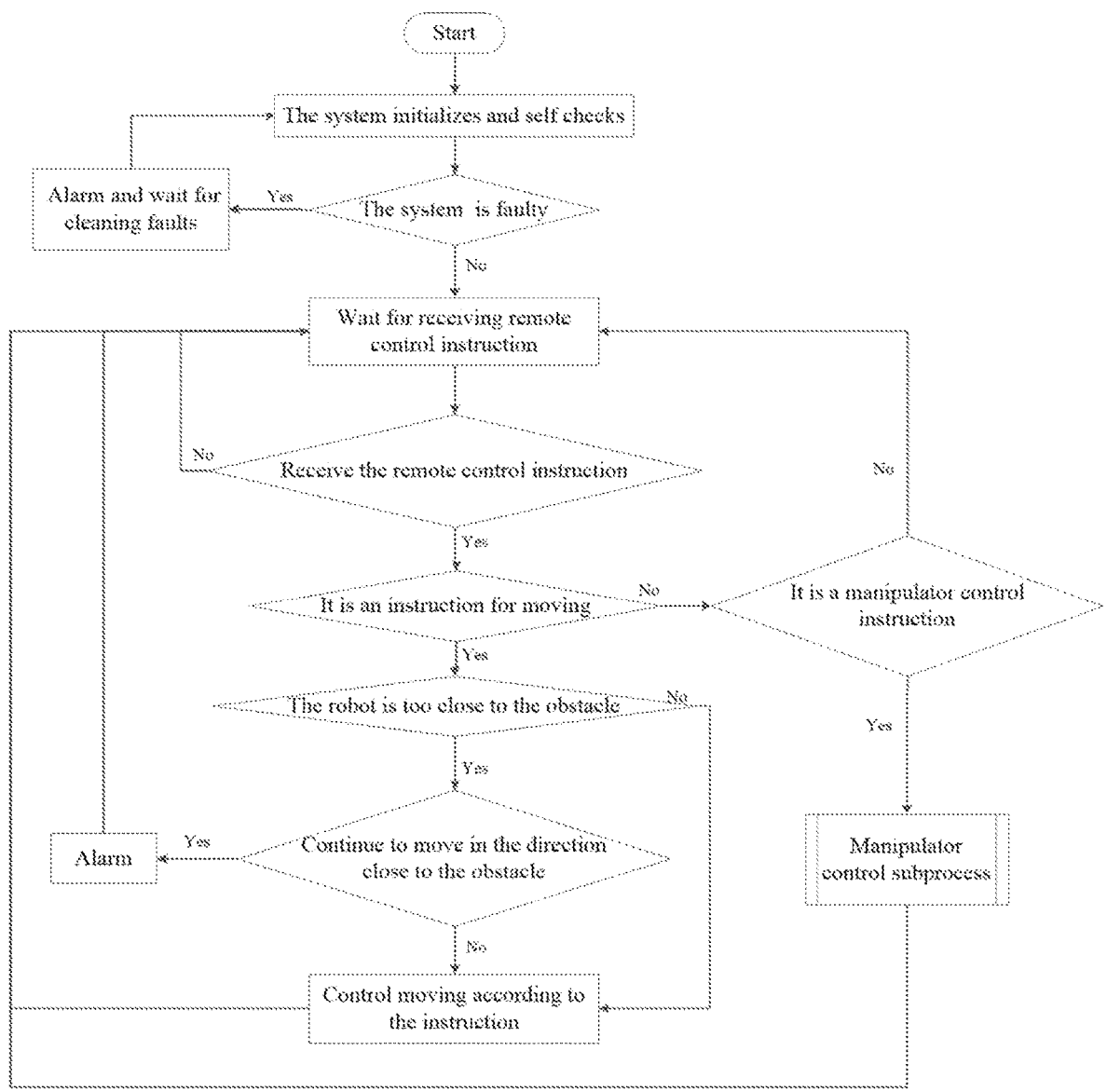
FIG. 6 is the main control flow chart.
Figure 7:
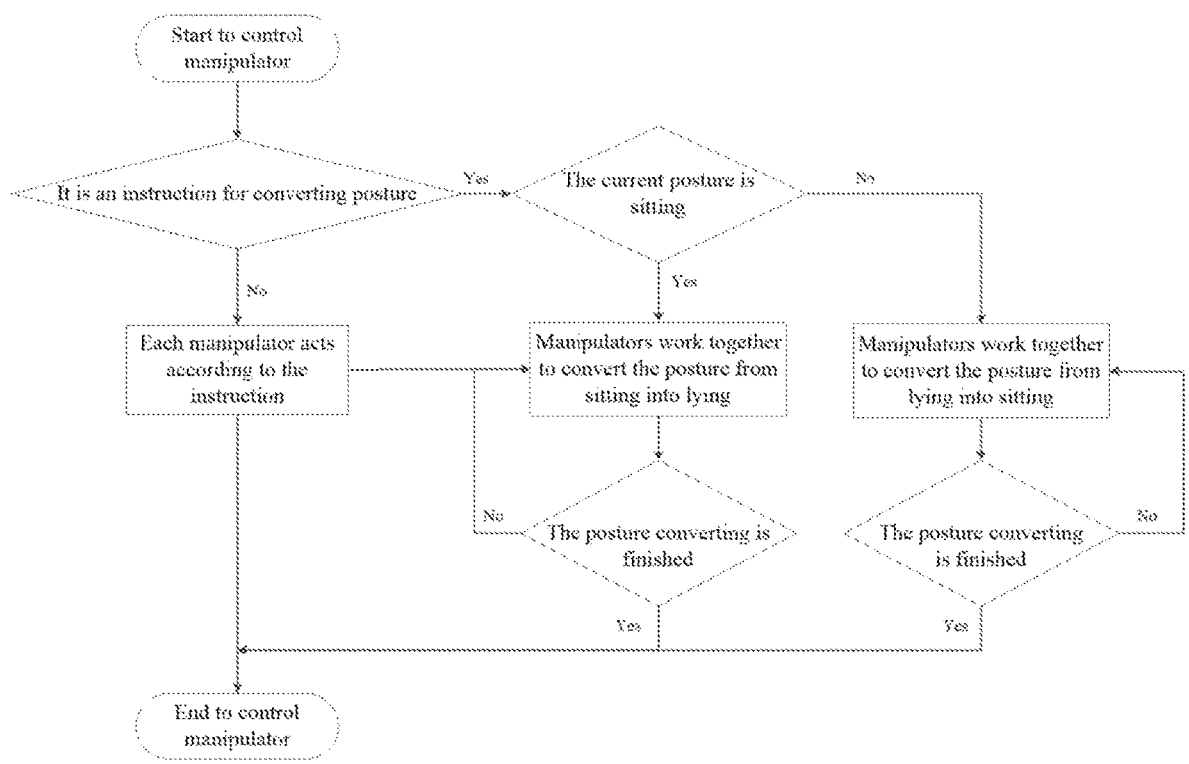
FIG. 7 is the control flow chart of the manipulator.

The control flow of the four-arm carrying robot is shown as FIG. 5 and FIG. 6. First, start the robot and wait for the robot system to initialize and self-test. If the system runs normally, it will wait to receive control instructions from operating handle 45. After receiving the control instructions, the main controller 41 will parse the instructions. If it is an instruction for moving, the location and distance of the obstacles will be calculated based on information collected from the ultrasonic sensor 44 at first. Then, if the current distance is less than the safe distance threshold and the moving direction in the instructions is towards the obstacles, the main controller 41 will send the stop instructions to the chassis moving sub controller and give an alarm, and the chassis moving sub controller 43 will stop the wheels and wait for the next instruction. Otherwise, the main controller will send the travel direction and speed information to the chassis moving controller 43, and the chassis moving sub controller 43 will control the motors according to the received instructions to act. If it is a manipulator control instruction, it will enter the manipulator control subroutine. If it is a posture conversion instruction, the main controller will plan the trajectory of each manipulator by trajectory planning algorithm, and then send the trajectory to the corresponding manipulator sub controller. The sub controller will control the movement of each joint of the manipulator based on received trajectory, and wait for the instruction of the operating handle again. If it is a single manipulator control instruction, the main controller will send the target position of the manipulator to the corresponding manipulator sub controller 42, and then the manipulator sub controller 42 will control the movement of each joint of manipulator.

The specific process of carrying the patient from one hospital bed to another by the four-arm carrying robot described in the present embodiment is as follows:

First, the folding mechanism in the front of each lower arm 15 is flattened, and the robot moves to one side of the hospital bed by remote control, and the position of each manipulator is adjusted so that the lower arm 15 of each manipulator can align to the gap between the patient and the hospital bed. Then, the robot is controlled to move forward slowly, so that the lower arm 15 of each manipulator can wedge into the gap until the frontal folding structure is fully exposed. Then, manipulators raise slightly and make adjustments so that the point of actions of them can be at the suitable positions. Then, the folding structure in front of each lower arm 15 is manually folded to fix the patient. After the fixation, the manipulators raise until the patient is completely separated from the hospital bed, and then the robot is controlled to move to one side of another hospital bed by remote control. After the patient is aligned to the proper position of the bed, manipulators slowly lower until the patient comes into contact with the bed, then the folding structure in front of the lower arm 15 is manually flattened, and then, the robot moves back and the lower arms 15 are extracted. During the extraction process, the manipulators should lower slightly to avoid the patient moving with the robot.

The specific process of carrying the patient from a hospital bed to a wheelchair by the four-arm carrying robot described in the present embodiment is as follows:

First, the process that the patient is lifted up from the hospital bed by the robot, is exactly the same as the above and will not be repeated. After the patient is fully lifted, the robot is controlled to move to one side of wheelchair, and make the patient's head closed to the side of the wheelchair backrest. Then, the manipulators closed to the head raise, and the shoulder joints and the wrist joints are rotated to convert the patient's posture from lying into sitting. Finally, the patient is aligned to the wheelchair, and manipulators lower synchronously and slowly. After the patient is placed on the wheelchair, the robot moves back and the lower arms 15 are extracted. So far, the carrying of a patient from a hospital bed to a wheelchair is completed.

Evidently, the embodiments which specifically explained above are only part of the present invention, not all of them. Based on the embodiments of the present invention, all other embodiments, obtained by those ordinary skilled in the art without creative work, belong to the protection scope of the present invention.

The embodiments of the present invention are described in detail above, but the present invention does not limit to the implementation cases described above. Within the scope of knowledge possessed by those ordinary skilled in the art, various changes can also be made without departing from the purpose of the present invention.

The invention claimed is:

1. A multi-arm robot for realizing conversion between sitting and lying posture of patients and carrying patients to different positions, comprising a manipulator module, a trunk module, a chassis moving module and a control module, and that the manipulator module comprises at least 3 manipulators and has at least three points of action on human body: shoulder-back, a point between caudal vertebrae and lumbar vertebrae and knee;

the trunk module comprises a trunk column, a trunk shell and two linear module connected to the manipulators by manipulator connectors;

the chassis moving module comprises a chassis frame, a telescopic counterweight and omnidirectional wheels; the upper part of the chassis frame is connected with the trunk column; the telescopic counterweight is arranged on the chassis frame; and the omnidirectional wheels are arranged around the chassis frame in a cross layout;

the control module comprises a main controller, two manipulator sub controllers, a chassis moving sub controller, an ultrasonic distance sensor and an operating handle; the main controller and the manipulator sub controllers are arranged inside the trunk column; the chassis moving sub controller is arranged under the chassis frame; the ultrasonic distance sensor is arranged around the chassis frame; the operation handle sends the operation instructions to the main controller by wireless communication; the main controller sends the corresponding control instructions to the manipulator sub controllers and the chassis moving sub controller, and the sub controllers control the manipulators and the chassis moving module to act according to the instructions received; the ultrasonic distance sensor sends the distance information to the main controller by sub controllers, and the main controller judges whether there is a collision risk; the main controller will perform an emergency stop operation and give an alarm if necessary;

each manipulator comprises a shoulder joint, an upper arm, an elbow joint, a wrist joint and a lower arm; the shoulder joints realize left/right rotation of the manipulator to adjust the location of points of action; the elbow joints realize forward/backward rotation of the manipulators to adjust inclination angles of the lower arms; the wrist joint realizes the rotation of the lower arm to adjust contact angles between the lower arms and patients; each lower arm consists of a lower arm plate and a frontal movable folding structure including a baffle and a pull plate used to fix the baffle;

each manipulator has four degrees of freedom, including a linear moving pair at the shoulder, a rotating pair at the elbow and a rotating pair at the wrist.

2. The multi-arm robot for realizing conversion between sitting and lying posture of patients and carrying patients to different positions according to claim 1, wherein, in addition to the three manipulators acting on shoulder back, a point between the caudal vertebrae and the lumbar vertebrae and knee, it also includes other manipulators whose points of action are distributed on head, thighs and maneuver positions of human body; the manipulators can be arranged on both sides and in front of the trunk.

3. The multi-arm robot for realizing conversion between sitting and lying posture of patients and carrying patients to different positions according to claim 1, wherein the lower arm of each manipulator is a flat structure.

4. The multi-arm robot for realizing conversion between sitting and lying posture of patients and carrying patients to different positions according to claim 3, wherein the trunk column is a hollow structure; each linear module comprises a linear module fixed seat and a linear module sliding table; the linear module fixed seats are fixed on the side wall of the trunk shell; the linear module slides are connected with the manipulator by manipulator connector; the linear module fixed seats are fixed on the outer wall of trunk column; the trunk shell is wrapped up outside the trunk column.

5. The multi-arm robot for realizing conversion between sitting and lying posture of patients and carrying patients to different positions according to claim 1, wherein the telescopic counterweight includes two sliding guides, a counterweight seat and counterweight blocks; the fixed rails of the sliding guides are fixed on the chassis frame; the counterweight seat is connected to the sliding rails of the sliding guides; the counterweight blocks are placed on the counterweight seat; the omnidirectional wheels are equipped with shock absorbers.

6. The multi-arm robot for realizing conversion between sitting and lying posture of patients and carrying patients to different positions according to claim 5, wherein the main controller is connected with the manipulator sub controllers and the chassis moving sub controller by EtherCAT bus; the manipulator sub controllers are connected to the linear modules and joint modules by CANopen bus.

\* \* \* \* \*